July 7, 1931.  E. STAUDER  1,813,825
MACHINE FOR GRINDING SAWS
Filed Oct. 12, 1927  6 Sheets-Sheet 1

INVENTOR
Emanuel Stauder
BY
his ATTORNEYS

July 7, 1931. E. STAUDER 1,813,825
MACHINE FOR GRINDING SAWS
Filed Oct. 12, 1927 6 Sheets-Sheet 2

INVENTOR
Emanuel Stauder
BY
his ATTORNEYS

July 7, 1931.   E. STAUDER   1,813,825
MACHINE FOR GRINDING SAWS
Filed Oct. 12, 1927   6 Sheets-Sheet 3

INVENTOR
Emanuel Stauder
BY
his ATTORNEYS

July 7, 1931.  E. STAUDER  1,813,825
MACHINE FOR GRINDING SAWS
Filed Oct. 12, 1927  6 Sheets-Sheet 4

Fig. 4

INVENTOR
Emanuel Stauder
BY
his ATTORNEYS

July 7, 1931.  E. STAUDER  1,813,825
MACHINE FOR GRINDING SAWS
Filed Oct. 12, 1927   6 Sheets-Sheet 6

INVENTOR
*Emanuel Stauder*
BY
*his* ATTORNEYS

Patented July 7, 1931

1,813,825

UNITED STATES PATENT OFFICE

EMANUEL STAUDER, OF ROCHESTER, NEW YORK, ASSIGNOR TO HUTHER BROTHERS SAW MFG. CO., OF ROCHESTER, NEW YORK, A CORPORATION OF NEW YORK

MACHINE FOR GRINDING SAWS

Application filed October 12, 1927. Serial No. 225,831.

This invention relates to grinding apparatus, and more particularly to machines for grinding and sharpening various sorts and sizes of cutting tools such, for example, as circular saws. One object of the invention is to provide an improved unitary apparatus of this character which is simple, rugged and compact in construction and arrangement, and efficient and economical in operation.

Another object is the provision of a machine of this nature which may be accurately adjusted with quickness and ease, and in which all of the parts have a maximum degree of adjustment so that the machine will be practically universal in its range. A further object is to increase the speed at which a saw may be ground or sharpened and to enable the operator to accurately grind or sharpen all of the teeth of a saw after once adjusting the machine.

A further object is the provision of a machine of this nature which is adapted to perform various kinds of grinding operations, such as sharpening the front of the teeth, chamfering the sides and undercutting the front.

A further object is the provision of a machine of this character having simple and effective means for accomplishing axial and rocking movement of the grinding wheel relative to the saw to be ground.

Still a further object is the provision of gaging or indexing mechanism which is effective for accurately positioning the saw or tool with relation to the grinding mechanism, and which will permit each tooth to be accurately positioned with respect to the saw with but a single setting of the indexing mechanism.

To these and other ends the invention consists in certain improvements and combinations of parts, all as will be hereinafter more fully described, the novel features being pointed out in the claims at the end of the specification.

In the drawings.

Similar reference numerals throughout the several views indicate the same parts.

The invention provides a mechanism of the class described of a high degree of operating efficiency, and which is particularly advantageous in grinding or sharpening the teeth of circular saws. To this end the invention is embodied in the present instance in a saw supporting means, a grinding wheel adapted to engage a saw supported thereby, and an indexing device for positioning a saw on the saw support in proper cooperative relation to the wheel. A motor is provided for driving the grinding wheel and all of the parts are preferably supported for individual adjustment on a common base.

Referring more particularly to the drawings, the present embodiment comprises a suitable supporting frame or base 15, preferably formed from a steel casting. The saw supporting device 16 is mounted on the base for adjustment therealong so as to support saws of any size thereon in proper relation to the grinding unit. The grinding unit 17 is mounted at an end of the base for various adjustments thereon to enable the grinding wheel to be secured in a multiplicity of adjusted positions with relation to a saw on the supporting device 16. The indexing mechanism 18 is mounted on the base for adjustment thereon so that it can be secured in a desired position with respect to the teeth of a saw of any size which is supported by the element 16. The motor unit 19 is preferably supported on the base in a position above the grinding unit and includes any suitable prime mover, such as an electric motor, which can be secured in various positions of adjustment to hold it in proper cooperative relation to the grinding unit.

The base 15 may be secured upon a work table or bench in any suitable manner, such as by means of bolts which are adapted to be inserted into apertured lugs 15a disposed at various points on the base.

Figures 1, 6:
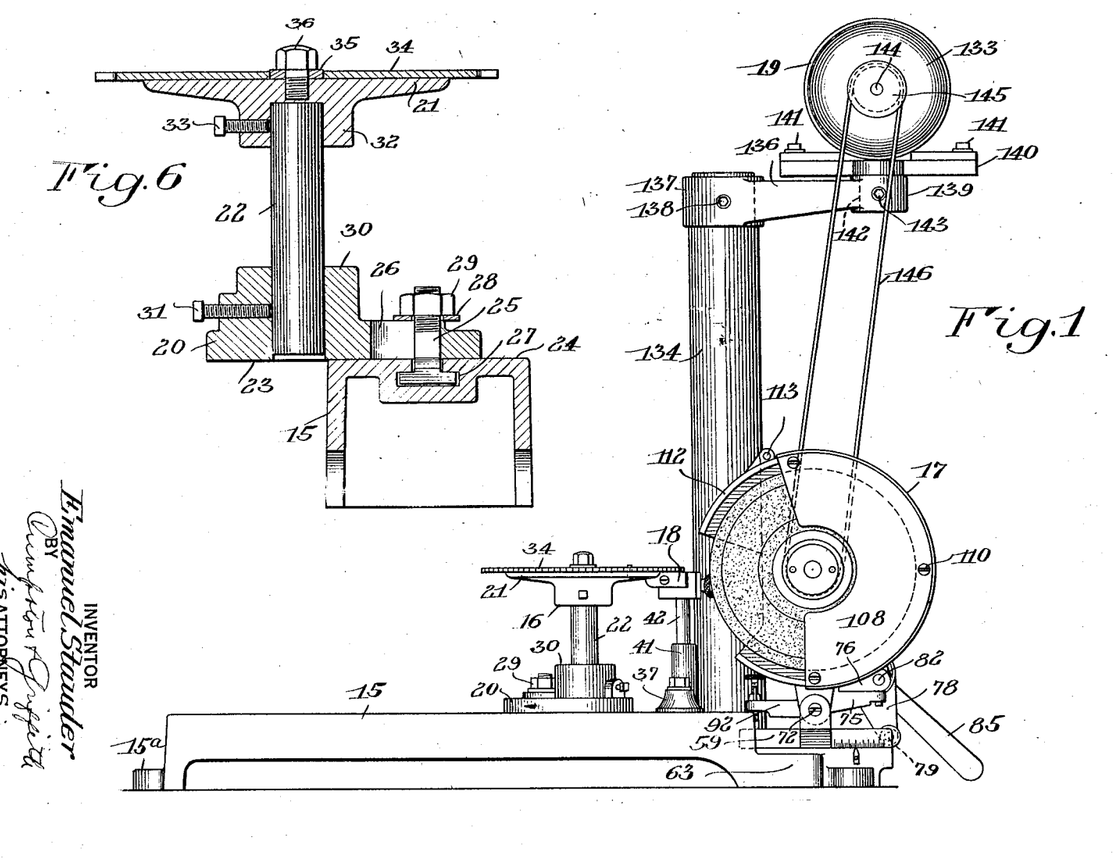
Figure 1 is a side elevation of a device embodying the invention.
Figure 6 is a sectional view taken substantially on line 6—6 of Figure 8 showing the manner of supporting and adjusting the saw table on the base frame.

The saw supporting device 16 is preferably mounted for either longitudinal or lateral adjustment along the base and is constructed so as to support the saw at different elevations above the base. This device comprises a foot member 20 and a table member 21 connected by a standard 22. The foot member 20 is formed from a casting having a flat lower surface 23 which is adapted to slide on the flat upper surface 24 of the base 15. The foot member 20 may be held in any desired position on the base 15 by means of a T-head bolt 25 engaging in an elongated slot 26 in the foot 20 at one end, and in a longitudinally disposed T-shaped groove 27 in the base 15 at the other end. The bolt 25 is threaded at its upper end and has a washer 28 and nut 29 thereon by which the foot member may be securely tightened in any angular position along the length of the base. The foot member 20 has an upstanding apertured boss 30 at its outer end for receiving the lower end of the standard 22 which is slidable vertically in said boss and is held in any adjusted position therein by a set screw 31 screwed into said boss and engaging the standard as shown in Figure 6.

The saw table 21 has a central opening in a projection 32 on its under side into which the upper end of standard 22 is received. A set screw 33 is screwed into the projection 32 and bears against the upper end of standard 22 for holding the table in fixed position thereon. A saw 34 is shown positioned on the table 21 and is held in place by a centering element 35 fixedly secured to the table by means of a bolt 36 screwed into said table. The element 35 is of a size to snugly fit within the arbor opening of the saw so that the saw may be turned therearound to present successive teeth to the grinding element. If a saw having a larger arbor opening is to be ground the centering element 35 will be replaced by a larger one of a size to fit the larger opening.

Figure 4:
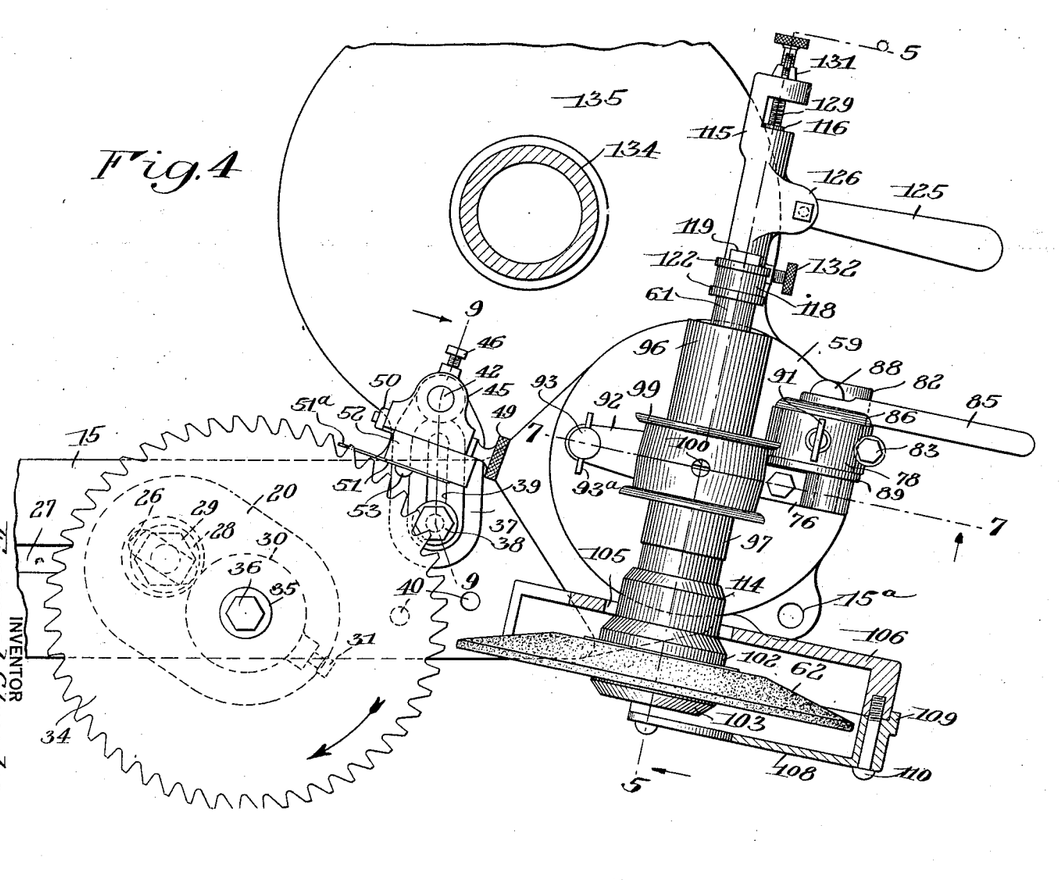
Figure 4 is an enlarged partial plan view similar to Figure 2 but with certain parts omitted for the sake of clearness.

The gaging or indexing mechanism 18 is adapted to hold the saw in proper relation to the grinding wheel. This mechanism is best shown in Figures 1 and 4 in combination with other parts, and in Figures 9, 10 and 11 in detail. A foot member 37 is adjustably secured upon the base 15 by means of a bolt 38, engaging in a slot 39 in said foot member, which is adapted to be screwed into any one of a plurality of threaded openings 40 in the base. In an upstanding apertured boss 41 on the foot member is a vertically slidable standard 42 which is suitably held in any vertically adjusted position by a set screw 43.

The head of the indexing mechanism, designated in its entirety at 44, includes an apertured block 45 in which the upper end of the standard 42 is engaged, being held therein by a set screw 46. The block 45 has spaced bosses 47 thereon into which are journalled the ends of an adjusting screw 48 having a knurled head 49. The screw 48 is held in position by means of a suitable collar and pin retaining means designated generally at 50. A resilient detent 51 having an upturned end 51a is mounted for sliding movement with relation to block 45 on the outer ends of the bosses 47. A block 52 is capable of supporting said detent in different positions thereon as by means of a screw 53 which engages in any one of a plurality of openings 54 in the detent and may be screwed into any one of a plurality of threaded apertures 55 in the block 52. By this means the detent may be placed in an extended or retracted position from that shown in Figure 10 or it may be completely reversed to extend in the other direction. The block 52 is guided on block 45 by means of an offset portion 56 on block 52 engaged between upper and lower projecting shoulders 57 on block 45. The means for controlling the movement of the detent with relation to the block 45 comprises an apertured lug 58 disposed on the rear face of the block 52 and provided with threads therein cooperating with the threads on the adjusting screw 48. It will be seen that there is thus provided an indexing mechanism which can be placed in proper relation to the saw on either side thereof depending on which way the teeth are disposed; it can also be adjustably held in any angular position on the base either around bolt 38 or around standard 42; it can be adjusted vertically along such standard; and after this preliminary adjustment the detent 51 may be very accurately adjusted by the screw 48 with relation to the block 45 to properly position the teeth with respect to the grinding wheel.

The grinding unit 17 comprises essentially a rotatable supporting plate or turn table 59 which carries a rocking frame or support 60, which in turn supports the arbor 61 on which is mounted the grinding or abrading tool or wheel 62.

Figure 3:
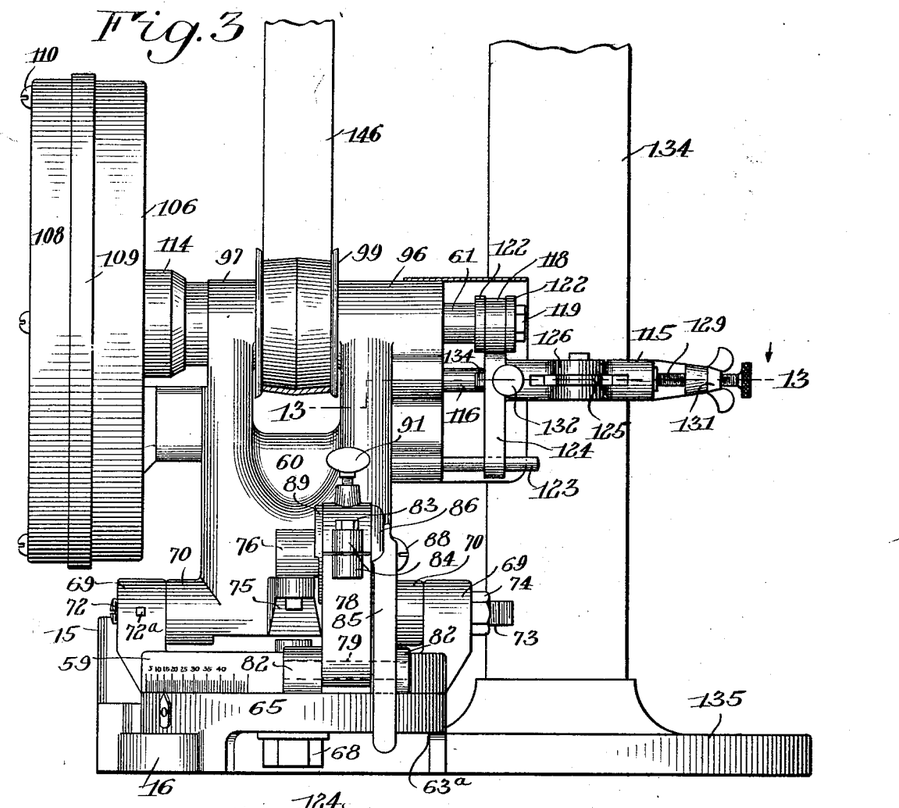
Figure 3 is an enlarged end elevation looking from the front of the device or toward the left in Figure 1.

The rotatable supporting plate 59 is mounted on a downwardly offset extension 62 integrally formed at one end of the base 15. It comprises a flat annular casting having an annular bearing ring 64 with contacts with a correspondingly shaped portion 65 on the base extension 63. The plate 59 is secured for rotation upon the surface 65 by means of a bolt 66, the head of which engages in a depression 67 on the upper face of the plate 59, and passes through registering apertures in members 59 and 65, its lower end being engaged by a nut 68. On referring to Figure 3, it will be noted that the extension 63 of the base 15 is formed with a section thereof cut away as at 63a to allow for the ready insertion of a wrench therein to tighten or loosen the nut 68.

A graduated scale 59a may be provided on the plate 59 for cooperation with fixed pointer 65a on the base portion 65, for the purpose of assisting the operator in properly adjusting the grinding wheel.

Upstanding lugs or bosses 69 are formed at opposite sides of the supporting plate 59 for supporting the rocking frame 60. The frame 60 is provided at its lower end with trunnion lugs 70. These lugs have hollow bearing portions 71 which receive the ends of pintle bolts 72 and 73 which are screw threaded into suitable apertures formed in the lugs 69. The bolt 73 is formed with a square end for engagement by a suitable wrench to cause the bolt to engage the bearing surfaces with the desired degree of tightness. A lock nut 74 may be provided to hold the bolt 73 in a desired adjusted position. The pintle bolt 72 is formed with a slotted end for the reception of the end of a screw driver for adjusting the same to the proper degree of tightness against its bearing 71. Bolt 72 may be held from turning by means of a set screw 72a threaded into its trunnion lug 70 and bearing against said bolt.

Suitable means are provided for manually controlling the rocking movement of frame 60 with relation to the supporting plate 59. This consists, in the present instance, of an eccentric mechanism connected at one end to plate 59 and having at its other end a manually operated crank means which is connected to an arm on frame 60 (see Figures 3, 7, 8 and 12). The arm or projection, designated 75, is preferably integrally formed at the lower end of frame 60 at a point intermediate its trunnions. The arm carries a bearing member 76 which is suitably secured thereon by a bolt 77. A vertically disposed link 78 is connected at its lower end by a pivot pin 79 to the plate 59. At its upper end the link 78 has an eccentric strap or bearing member 80 formed thereon, which surrounds an eccentric hub 81 carrying a crank pin 82 which is journalled within the bearing member 76 on the arm 75. The bearing 80 is preferably split and may be adjustably clamped on the hub 81 by means of a bolt 83 passing through lugs or ears 84 formed on said bearing.

The eccentric hub 81 may be turned within the bearing by means of a handle 85, having an integral disk portion 86 formed on its inner end which is secured from turning on the face of the hub 81 by means of dowel pins 87 and machine screw 88. The disk portion 86 is larger than the hub and acts as a retaining member for that side of the hub by reason of its engagement with the strap or bearing 80. For retaining the hub at the other side a collar or flange 89 is formed integrally thereon. The flange 89 does not extend entirely around the hub but is preferably cut away at 90 to allow for proper association of the crank 82 and bearing 76.

The eccentric hub 81 and the bearing or strap 80 may be secured against relative rotative movement by means of a set screw 91 threaded into the strap 80 and engaging the hub at its inner end. The set screw 91 may also be used merely to increase the friction between the parts so that they will not work too freely. This may also be effected by tightening the bolt 83 to draw the lugs 84 closer together.

Figure 7:
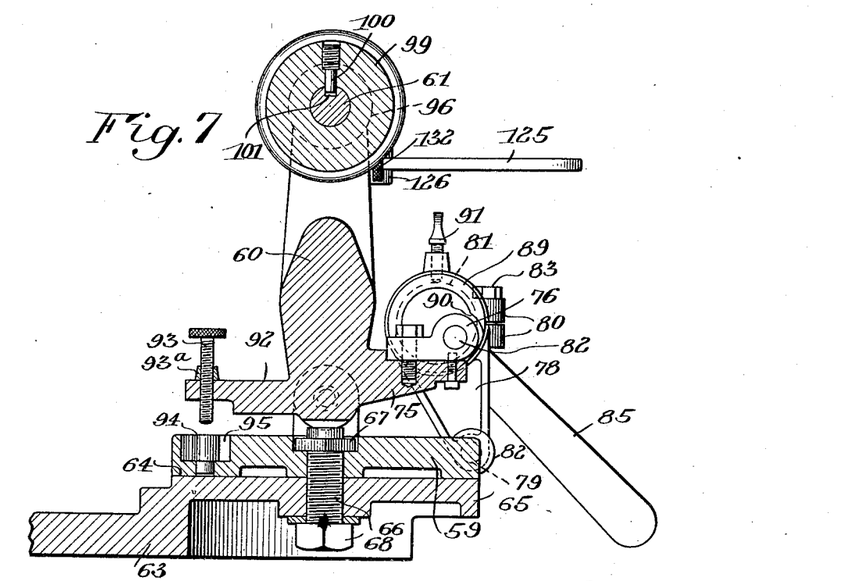
Figure 7 is a sectional view taken on line 7—7 of Figure 4 illustrating the means for rocking the grinding wheel frame on its turret.
Figure 8:
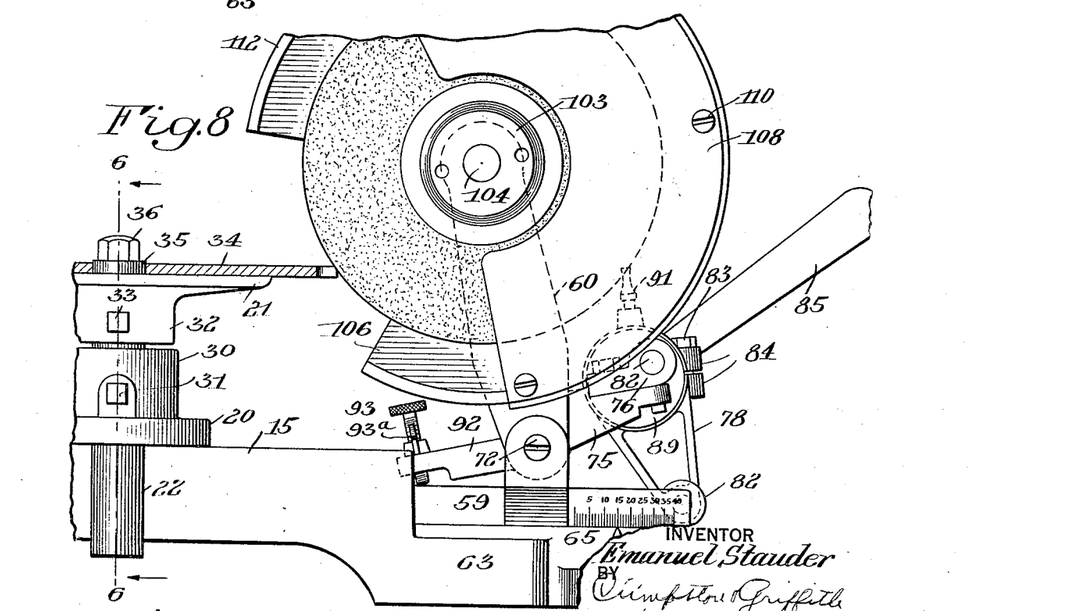
Figure 8 is a fragmentary side elevation of the parts shown in Figure 1, but showing the grinding wheel in operative relation to the saw.
Figure 12:
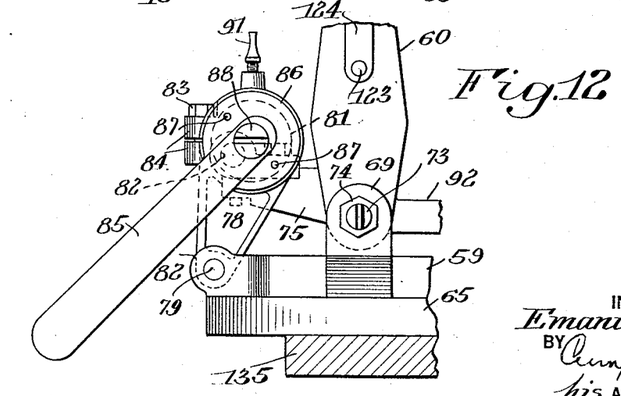
Figure 12 is a detail view of the means for rocking the grinding wheel frame on the turret.

From the above description it will be seen that when handle 85 is in its lowered position as shown in Figure 7, the rocking frame 60 will be positioned substantially vertically on the plate 59, and when the handle has been raised to the position shown in Figure 8 the rocking frame will be inclined in the direction of the saw supporting table.

Means for limiting the tilting movement of the rocking frame 60 is preferably provided, which comprises an extension arm 92 formed thereon and projecting outwardly on the other side of the frame from the arm 75. The end of the 92 has a screw threaded aperture therein to accommodate an adjusting screw 93, the lower end of which is adapted to contact with a case hardened plug 94 positioned in an opening 95 formed in the base 59. A wing nut 93a is provided for the purpose of locking the adjusting screw 93 in any adjusted position. It will thus be seen that the rocking element 60 cannot be tilted forwardly by handle 85 any further than permitted by the lower end of adjusting screw 93 when such end strikes the surface of the plug 94.

The upper end of the rocking frame 60 is provided with a pair of spaced journal bearings 96 and 97 into which are fitted suitable bushings 98, 98 for rotatably supporting the arbor 61. Located between the journals 96 and 97 on the arbor 61 is a pulley 99 which is secured to the arbor by means of a bolt 100, threaded into a radial aperture in the pulley and at its lower end engaging in a slot 101 in the arbor. This slot and bolt connection provides for a relative sliding movement between the pulley and arbor for a purpose which will be later brought out. The grinding wheel 62 is secured on the end of the arbor 61 between a head 102, formed adjacent the end of the arbor, and a threaded collar or nut 103 which is secured on the threaded end 104 of the arbor. The head 102 is provided with a suitable collar portion 105 which extends toward the journal member 97 and loosely surrounds the end thereof for the purpose of preventing grit from entering the arbor bearing.

The grinding wheel may be provided with any suitable guard or housing member. In the present instance I have shown a housing member comprising a section 106 secured to the rocking support 60 by a bolt 107 and a dowel pin 107a to prevent the section from turning on said bolt. The housing section 106 carries a complementary housing section 108, having a flange 109 surrounding the edge of section 106 to form a tight joint b therebetween. The housing sections 106 and 108 are suitably secured together by a plurality of bolts 110. A pivoted housing section 112 is secured to the housing section 106 by means of pivot bolt 113. This section 112 is in its lower position as shown in Figure 1, but when it is desired to adjust the grinding wheel with relation to the saw this section may be swung upwardly to provide the operator with an unobstructed view of the wheel from above. The housing section 106 has a suitable opening 114 to provide for clearance in the movement of the head 102 and collar 105 therethrough.

Figure 5:
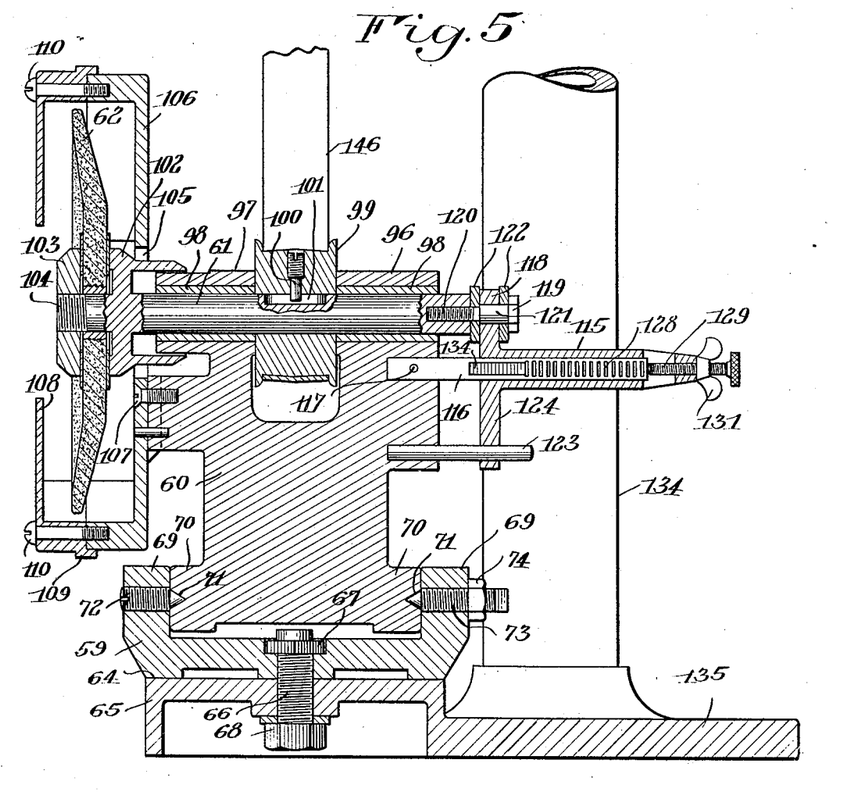
Figure 5 is a vertical section taken substantially on line 5—5 of Figure 4, looking in the direction of the arrows.

The means for shifting the arbor 61 axially with relation to the journals 96 and 97 will now be described. A crosshead member 115 is slidably mounted on a rack element 116, which has one end inserted in suitable aperture formed in the rocking member 60 and is held in place by a pin 117, all as shown in Figure 5. On its upper side the crosshead 115 is formed with an upwardly projecting arm 118 by which it is secured to the end of arbor 61 opposite to the grinding wheel 62. Any suitable means for connecting the extension 18 to the arbor may be utilized. In the present instance I have shown a threaded bearing bolt 119 which may be secured in a threaded aperture 120 in the end of the arbor 61. Adjacent the head end of bolt 119 is formed a bearing section 120 which snugly fits within an opening in the end of arm 118. Suitable washers 122 may be provided on each side of the arm 118 surrounding the bolt 119.

Figure 13:
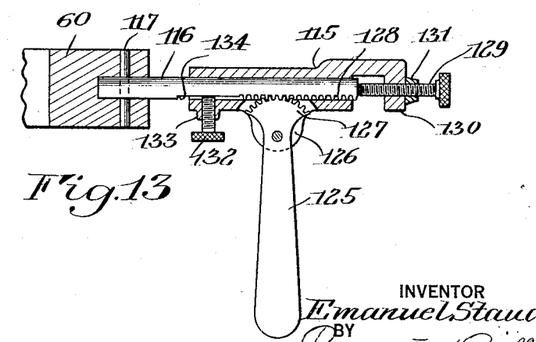
Figure 13 is a detail sectional view taken on substantially line 13—13 of Figure 3.

Suitable guiding means may be provided below the crosshead 115 for insuring even movement of the crosshead. In the present instance this is in the form of a rod 123 secured at one end in the rocking frame 60 and slidably engaged at its other end in an aperture formed in a downwardly projecting arm 124 on the crosshead 115. A handle 125 is pivotally mounted between a pair of lugs 126 on the crosshead 115 and is provided at its inner end with a segmental gear element 127 which meshes with rack teeth 128 on the rack 116. From this construction it will be seen that when the handle 125 is moved toward the right or the left, as shown in Figure 13, the crosshead 115 will be caused to move with relation to the rack 116, thus moving the arbor 61 endwise in its bearings.

Means are preferably provided for adjustably limiting the endwise movement of the arbor in its bearings. This means may comprise an adjusting screw 129, threaded within an aperture in an extension 130, at the end of crosshead 115, and engaging the end of the rack 116. (See Figures 5 and 13.) A lock nut 131, threaded on the bolt 129, is used to secure the bolt in desired adjusted position. Thus, by turning the bolt so that its end recedes from or approaches the end of rack 115, it will be seen that the arbor 61 may be permitted to have a greater or less sliding movement in its bearings.

A set screw 132 is threaded in a lug 133 in the crosshead 115 and is adapted to bear at its inner end against a flat surface 134 formed on the rack member 116. When it is desired to hold the arbor 61 in a fixed position with relation to its bearings this set screw 132 is turned so as to tightly engage the flat surface 134.

The motor unit 19 may be located in any suitable manner on or off of the base and may include any well known prime mover for furnishing driving power to the pulley 99 on the grinding wheel arbor. In the present instance there is shown an electric motor 133 adjustably supported on the base 15 by means of a standard 134. The lower end of the standard is suitably secured, as for example by means of screw threads, in an extension 135 on base 15. On the upper end of the standard 134 is supported a bracket or arm 136 for swinging adjustment thereon. The arm 136 has an enlarged apertured boss 137 at its inner end which surrounds the upper end of the standard 134 and may be held in any angular position thereon by means of a set screw 138 which is threaded into the boss 137 to bear at its inner end against the standard. The outer end of the bracket arm 136 is provided with an apertured boss 139. A motor supporting table 140 supports the motor 133 which is bolted thereto in the usual manner by bolts 141. Depending from the under side of the table 140 adjacent one edge thereof is a cylindrical projection 142 which rotatably fits within the apertured boss 139 so that the motor support may be swung to various angular positions with relation to said arm 136. A set screw 143 is provided for holding the motor support in any desired angular position on the arm 136.

The motor shaft 144 has a pulley 145 thereon adapted to drive pulley 99 by means of a belt 146. It will be apparent, that by the mechanism just described, it is possible to correctly align the pulley 145 with the pulley 99 no matter to what angle the grinding wheel has been adjusted.

In the operation of the device, a saw which it is desired to grind or sharpen is placed on the table 21 and is centered thereon by the circular member 35 which fits within the arbor opening of the saw. A grinding wheel of suitable shape and thickness proper for this purpose is selected and placed on the arbor 61. The saw table is then moved toward the grinding wheel by sliding its foot member 20 along the base 15. When the teeth of the saw are in a position closely adjacent the grinding wheel, the latter is swung toward the saw on the bearings 72 and 73 by raising the handle 85 so that it enters between the teeth and engages the front or cutting face of a tooth along a line substantially coincident with its contour.

In case the saw tooth is not presented at the proper angle, the foot member 20 may be turned about its securing bolt 25, or it may be moved with relation to the bolt along the slot 26. At the same time that the saw table is being angularly adjusted about the bolt 25 it will probably be necessary to angularly adjust the grinding wheel by swinging the rotary plate 59 on the base portion 65. This may be done by lateral pressure on the handle 85. If swinging the wheel does not bring the saw into proper position it may be moved axially by the handle 125 which controls the endwise sliding movement of the arbor 61 in its bearings.

When the saw teeth and the grinding wheel are in proper relative position, the foot member 20 will be fixedly secured on the base 15 by tightening the nut 29 on bolt 25, the plate 59 is secured from rotation on the base by tightening the nut 68 on bolt 66, and the arbor is held from endwise sliding movement in its bearings by tightening the set screw 132 against the flat surface 134 on the rack 116.

After the grinding wheel has been secured in proper angular position the motor 133 will be adjusted by turning movement of the arm 136 and table 140 to align the pulleys 145 and 99 so that the belt 146 will run straight thereover.

For regulating the depth of cut of the grinding wheel when the wheel is rocked on the frame 60, the adjusting screw 93 is rotated so that its end strikes against the surface of the plug 94 to limit further movement of the wheel into the saw. This screw may then be secured in adjusted position by lock nut 93a. The screw is preferably adjusted so that the grinding wheel will just swing to the bottom of the tooth and will not grind into the body of the saw.

Figures 2, 9, 10, 11:
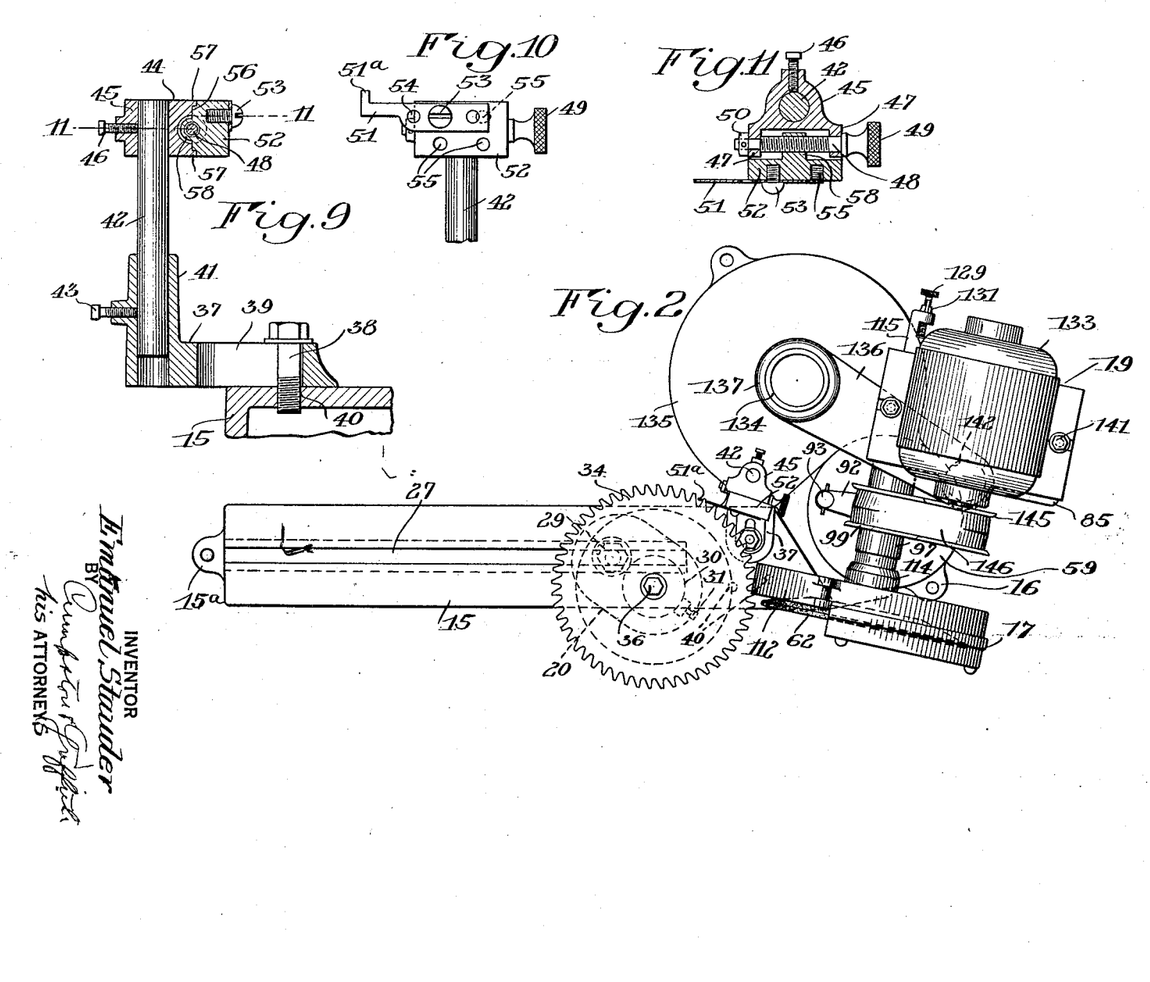
Figure 2 is a plan view of the same.
Figure 9 is a detail sectional view taken on line 9—9 of Figure 4 showing the means for supporting the gaging or indexing mechanism on the base frame.
Figure 10 is a detail of the mounting for the tooth engaging detent of the indexing mechanism.
Figure 11 is a sectional detail on line 11—11 of Figure 9.

The indexing device is then brought into position so that the detent 51 will engage the front face of a tooth as shown for example in Figure 2. The indexing mechanism may be adjusted to various positions for engaging the teeth of saws of varying sizes. It may also be positioned so as to engage the teeth on the opposite side of the grinding wheel from that shown in Figure 2 as explained above.

When saws of relatively large diameter are to be ground the indexing device will be positioned so that it is more nearly adjacent the grinding wheel and the upper side of blocks 45 and 52 bear against and supports the under side of the saw adjacent its periphery.

After the indexing device is given a preliminary adjustment with respect to the saw to be ground, in the manner just described, the grinding wheel is set in rotation by starting the motor 133. The operator then moves the handle 85 upwardly to the position shown in Figure 8 so that the wheel engages the front of a tooth. Due to the manner of setting or adjusting the parts, the wheel will just contact the front face so that no substantial grinding will be effected. The detent 51 on the indexing device 44 is then moved to the left as shown in Figures 2 and 4 by turning the screw 48 so that the wheel grinds off the front of the tooth the proper amount. The tooth is held in contact with the detent 51 by the hand of the operator bearing on the top face of the saw and turning it in a direction to hold the front face of the saw against the upturned end 51a.

When the operator has adjusted the detent so as to allow the front of the first tooth to be properly ground he leaves it in its adjusted position and does not again move it until he has finished grinding all of the teeth on that saw.

After the first tooth has been ground the grinding wheel is tilted away from engagement therewith by moving the handle 85 downwardly to the position shown in Figure 7, and the saw is rotated by the hand of the operator in a clockwise direction, as shown in Figure 4, until the upturned end 51a of the detent has ridden up over the inclined portion of one tooth and has snapped back into place in the space between that tooth and the next. The saw is then held by the operator so that the front face of the tooth bears against the detent. The grinding wheel is then moved toward the saw by means of handle 85 so that the face of a succeeding tooth will be ground. The upward movement of the handle will be continued until the end of screw 93 comes into contact with the hardened surface of plug 94 at which time the wheel will have reached its limit of movement at the bottom of the tooth. The remainder of the teeth are ground in the manner just described. All the operator needs to do after adjusting the parts for the first tooth is to move the handle 85 up and down, and to turn the saw after the grinding of each tooth and hold the same so that the detent 51 engages the face of a tooth.

If it is desired to make a different cut in the face of the tooth, such as an undercut to produce a chiseling effect, the wheel will be swung to a different angle by rotating the plate 15 and then secured in this position, after which the new grinding operation will be performed in a manner similar to that above described.

When it is desired to chamfer or bevel off a portion of the sides of the teeth of the saw, a grinding wheel having a flat periphery such as shown in Figure 8 will be substituted for the wheel as shown in Figure 5. The saw supporting table is then secured in a lowered position and the set screw 93 is adjusted so that the wheel will make a bevel of the desired inclination on the teeth. For this operation the indexing mechanism may or may not be used as desired. It is preferable, however, to use the indexing mechanism so that the teeth will be bevelled off uniformly. When performing this operation the operator will raise the handle 85 to engage the tooth with the wheel after a saw tooth has been brought into proper position with relation to the wheel. Every alternate tooth will be ground on one side of the saw and then the saw will be inverted for a similar grinding of the remaining teeth. Various other adjustments and arrangements may be made as will be apparent to one skilled in the art, to adapt the machine to accomplish a considerable variety of work.

The invention thus affords a grinding mechanism which is capable of easy, accurate and practically universal adjustment to adapt the device to saws of any size for cutting or sharpening teeth thereon of practically any shape or angle and with a minimum amount of manipulation of the device. The present disclosure shows a simple, compact and effective structure for embodying such mechanism, but this particular embodiment is to be taken, of course, in an illustrative rather than in a limiting sense, reference being had to the appended claims rather than to the foregoing description to indicate the scope of the invention.

I claim as my invention:

1. In a saw grinding device, a saw support, a frame adjacent said support, said frame being mounted to swing about a vertical and a horizontal axis, a grinding wheel, a member on which the wheel is fixed, said member being rotatably and slidably mounted on said frame, and means including a manually operable member for controlling the swinging movement of said frame about said axes so as to present said wheel in proper relation to a saw on said support.

2. In a saw grinding device, a saw support, a frame adjacent said support, said frame being mounted to swing about both a horizontal and a vertical axis, a member rotatably and slidably mounted upon said frame, a grinding wheel fixed on said member, means for adjusting said rotary member longitudinally upon said frame, and means for moving said frame toward said support so as to bring said wheel and saw into engagement.

3. In a saw grinding device, a base, a saw support thereon, a rotary plate on said base mounted so as to turn on an axis substantially perpendicular thereto, a frame pivoted to said plate and adapted to rock toward and from said support, an arbor journalled on and slidably mounted upon said frame in substantially in parallel relation to the pivotal axis thereof and adapted to support a grinding wheel thereon, a support extending from the frame, an operating member for the arbor slidably mounted upon said support and means for actuating said operating member.

4. In a saw grinding device, a base, a saw support thereon, a rotary plate on said base mounted so as to turn on an axis substantially perpendicular thereto, a frame pivoted at its lower end to said plate and adapted to rock toward and from said support, a bearing at the upper end of said frame, an arbor adapted to support a grinding wheel slidably mounted in said bearing for endwise movement therein, and means for controlling the sliding movement of said arbor.

5. In a device of the class described, a saw support adapted to carry a circular saw for rotary adjustment thereon, an indexing mechanism adjacent said saw support for cooperation with a saw thereon, said mechanism comprising a head adapted to support the saw, a detent comprising yieldable arm adapted to engage a tooth of said saw slidably mounted on said head, the detent being displaced by one tooth for automatic engagement with another, means for controlling the movement of said detent on said head and an upstanding shaft on the base adjustable vertically thereon, said head being adjustable about the axis of the shaft.

6. In a device of the class described, an indexing mechanism for use in adjusting a horizontally disposed circular saw with relation to a grinding wheel comprising a head mounted for rotation about an axis parallel to the axis of the saw, a yieldable detent member slidably mounted on said head, an adjusting screw rotatably mounted in said head, a threaded member connected with said yieldable detent and engaging said screw whereby when said screw is rotated the detent will be moved relatively to said head and means for reversibly supporting the detent upon the threaded member whereby the portion for engaging the tooth of the saw may be supported at opposite sides of the head.

7. In a device of the class described, a frame, an arbor journalled thereon and axially movable relatively thereto, rack and pinion means connecting said arbor and frame for effecting axial movement of said arbor on said frame and means for holding the rack and pinion means against relative movement, whereby to hold the arbor in adjusted position upon the frame.

8. In a device of the class described, a frame, an arbor journalled thereon and axially movable relatively thereto, a member connected to said arbor, rack and pinion means associated with said member and said frame for moving said member toward or away from said frame to thereby move said arbor axially and means associated with the rack and pinion means and said member for holding one against movement relative to another.

9. In a device of the class described, a base, a table rotatable upon said base about a vertical axis a supporting frame for a grinding wheel rotatable upon the table about a horizontal axis, an arbor journalled in said frame and axially movable with relation thereto, a toothed rack on said frame, a member connected to said arbor and movable upon said rack, and an operating part carried by said member and having teeth meshing with said rack, said part being movable to effect relative movement of the arbor.

10. In a device of the class described, a base, a table rotatable on said base about a vertical axis, a supporting frame for a grinding wheel pivotally supported on said table for a swinging movement about a horizontal axis, a rocking part on said table, a member journalled in said part and provided with a crank, and a bearing for said crank on said frame, said crank including a part for rotating said member to cause said frame to rock on its pivotal axis.

11. In a device of the class described, a base, a supporting frame for a grinding wheel pivotally supported on said base, an eccentric mechanism having a crank connected to said frame, link means operatively connected to said mechanism at its upper end and being pivotally connected at its lower end to said base, and means for turning said eccentric mechanism to move said crank whereby said frame will be tilted relatively to said base.

12. In a device of the class described, a supporting frame for a grinding wheel, supporting means for said frame upon which the latter is mounted for a swinging movement, an arbor journalled in said frame and movable axially therein, a rack connected with said frame, a member slidably engaging the rack and connected with the arbor for effecting axial movement thereof, and a lever pivoted upon said member and having teeth operatively engaging the teeth of the rack, movement of the lever in opposite directions serving to move said member in opposite directions upon the rack, said rack and associated parts for effecting axial movement of the arbor being arranged to swing with said frame about its pivotal axis.

13. In a device of the class described, a supporting frame for a grinding wheel, an arbor journalled in said frame and movable axially therein, a rack connected with said frame, a member slidably engaging the rack and connected with the arbor for effecting axial movement thereof, a lever pivoted upon said member and having teeth operatively engaging the teeth of the rack, movement of the lever in opposite directions serving to move said member in opposite directions upon the rack, adjustable means for clamping said member and rack together and means adjustable to regulate the extent of movement of said member upon the rack.

14. In a device of the class described, a base, a table rotatable about a vertical axis on said base, an upstanding frame pivoted upon the table to swing about a horizontal axis, a grinding wheel rotatably mounted upon the frame, an upstanding link having its lower end pivoted upon the table, an eccentric rotatable in the upper end of the link and pivotally connected with said frame for swinging it about its horizontal axis and operating means for the eccentric, said table and frame and the parts mounted thereon being rotatable as a unit about the vertical axis of the table.

15. In a device of the class described, a base, a table rotatable about a vertical axis on said base, an upstanding frame privoted upon the table to swing about a horizontal axis, a grinding wheel rotatably mounted upon the frame, an upstanding link having its lower end pivoted upon the table, laterally projecting arms carried by the frame, an eccentric rotatable in the upper end of said link and operatively connected with one of said arms, an adjustable member carried by the other arm arranged to cooperate with the table to limit the swinging movement of the frame upon the table and operating means for the eccentric.

16. In a device of the class described, a base, a table rotatable on said base about a vertical axis, an upstanding frame pivoted upon the table to swing about a horizontal axis, an arbor journaled in said frame and movable axially thereon, a grinding wheel carried by the arbor, a rack connected with said frame, a member slidably engaging the rack and connected with the arbor for effecting axial movement thereof, a lever pivoted upon said member and having teeth operatively engaging the teeth of the rack whereby movement of the lever will effect endwise movement of the arbor, an upstanding link having its lower end pivotally connected to the table, an eccentric rotatable in the upper end of the link and pivotally connected with said frame for swinging it about its horizontal axis and operating means for the eccentric.

17. In a saw grinding device, a base, a table rotatable upon the base about a vertical axis, a frame mounted to swing upon the table about a horizontal axis, an arbor journaled in said frame, a grinding wheel supported by the arbor, the swinging of the frame upon the table operating to position the arbor at different distances from the base, a pulley on the arbor, a support extending above the base, a bracket mounted for vertical adjustment upon the support, a motor upon the bracket having a horizontally disposed shaft provided with a pulley, the motor being adjustable upon the bracket about a vertical axis to position the pulley on the motor shaft substantially in alinement with the pulley on the arbor in different positions of adjustment of the arbor frame, the vertical adjustment of the bracket serving to compensate for the variation in distance between the arbor and base when the frame is swung to different positions and belt means connecting said pulleys.

18. In a saw grinding device, a base, a table rotatable upon the base about a vertical axis, a frame mounted to swing upon the table about a horizontal axis, means connecting said table and frame including an operating part for swinging the frame upon the table to different positions of adjustment, an arbor journaled upon the frame and having a grinding wheel and a pulley thereon, a standard extending upwardly from the base independently of the table, a horizontally disposed arm adjustable upon the standard about a vertical axis, a motor shaft mounted upon the arm for rotation about a vertical axis, a pulley on the motor shaft, and belt means connecting said pulleys.

19. In a device of the class described, a base, supporting means upon the base adapted to rotatably support a saw thereon, a bracket adjustable upon the base about a vertical axis, supporting means for the saw arranged for rotation upon the bracket about a vertical axis, a yieldable detent on the supporting means adapted to be successively engaged and displaced by the teeth of the saw upon rotation of the latter, said supporting means extending beneath the peripheral portion of the saw and being reversible without reversing the bracket, whereby to extend the detent in opposite directions for cooperation with the teeth of the saw to hold the saw against rotation with either face of the latter in engagement with the supporting means and a grinding wheel mounted upon the base for movement to and from engagement with the teeth of the saw.

20. In a device of the class described, a base, supporting means upon the base adapted to support a saw for rotation thereon, a bracket adjustable upon the base about a vertical axis, a support for the saw including a head adjustable vertically upon the bracket and arranged to extend beneath the peripheral portion of the saw to support the same, said head comprising relatively movable sections, one of which is adjustable horizontally upon the other, a yieldable self returning detent on said adjustable section adapted to be successively engaged and displaced by the teeth of the saw upon rotation of the latter on the supporting means therefor, and a grinding wheel mounted upon the base for movement toward and from the saw.

21. In a device of the class described, a base, means upon the base adapted to rotatably support the saw thereon, a supporting head for the saw arranged to extend beneath the latter and comprising relatively movable sections one of which is adjustable horizontally upon the other, a detent on the adjustable section arranged for engagement with the teeth of the saw to hold it against rotation in one direction, means on the base for supporting the head for rotation about a vertical axis to permit reversal thereof, whereby the detent may be extended in an opposite direction for cooperation with the teeth of the saw when the saw is in reverse position upon the support, and a grinding wheel mounted upon the base for movement to and from engagement with the teeth of the saw.

22. In a device of the class described, a base, supporting means upon the base adapted to rotatably support a saw thereon, a standard adjustable vertically upon the base, a supporting head for the saw carried by the standard comprising relatively adjustable sections, one of which is movable horizontally upon the other, a yieldable self returning detent mounted for reversal upon said movable section for cooperation with the teeth of the saw with either face of the latter in engagement with the supporting head, whereby to hold the saw against rotation, and a grinding wheel mounted for movement upon the base to and from engagement with the saw.

23. In a saw grinding device, a base, a grinding wheel thereon, a saw table on said base adjustable toward and from said wheel and being adapted to support a circular saw adjacent its center, an indexing mechanism upon the base including a head for supporting the saw arranged for vertical movement upon the base and for a rotary movement about a vertical axis, and a resilient self returning detent on the head for engaging the front of a tooth of said saw to hold said saw in proper relation to the grinding wheel, said detent being flexed outwardly by the back of the next succeeding tooth in advance of the one held thereby upon rotation of the saw in one direction.

24. In a device of the class described, a base, a table mounted upon the base for rotation about a vertical axis, a supporting frame for a grinding wheel pivotally supported on said table for a swinging movement about a horizontal axis and a combined link and eccentric connecting said frame and table for rocking said frame on its pivotal axis, said eccentric being rotatably mounted upon the link and said table and frame together with the eccentric and link being rotatable as a unit about said vertical axis.

EMANUEL STAUDER.